United States Patent [19]

Otto

[11] 4,378,005

[45] Mar. 29, 1983

[54] HEATING PELLET

[75] Inventor: Edgar Otto, Scotch Plains, N.J.

[73] Assignee: Therma-Tray Corporation, South Plainfield, N.J.

[21] Appl. No.: 261,896

[22] Filed: May 8, 1981

[51] Int. Cl.³ ............................................. A47G 23/04
[52] U.S. Cl. ...................................... 126/246; 126/375; 126/400
[58] Field of Search .................. 126/246, 375, 400; 219/385, 387; D7/23, 5; 206/503

[56] References Cited

U.S. PATENT DOCUMENTS

| | | | |
|---|---|---|---|
| 1,948,778 | 2/1934 | Zoia | 126/246 |
| 3,148,676 | 9/1964 | Truog | 126/246 |
| 3,916,872 | 11/1975 | Kreis | 126/246 |
| 4,052,589 | 10/1977 | Wyatt | 126/246 |

Primary Examiner—Samuel Scott
Assistant Examiner—G. Anderson
Attorney, Agent, or Firm—Curtis, Morris & Safford

[57] ABSTRACT

An improved heating pellet for keeping serving plates warm in hospitals and other food-service operations. The pellet is provided with a central hole and with notches in its rim for improving heating efficiency in forced-air convection ovens, said notches also permitting convenient removal of serving plates. Spacers are also provided for reducing heat loss to the surface on which the pellet rests.

5 Claims, 4 Drawing Figures

FIG.3
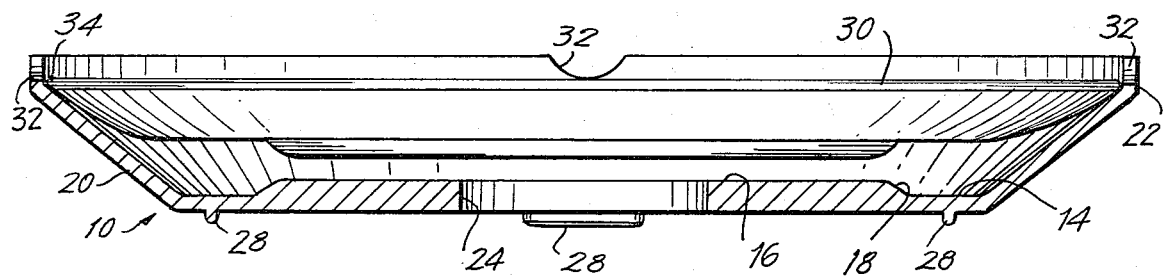
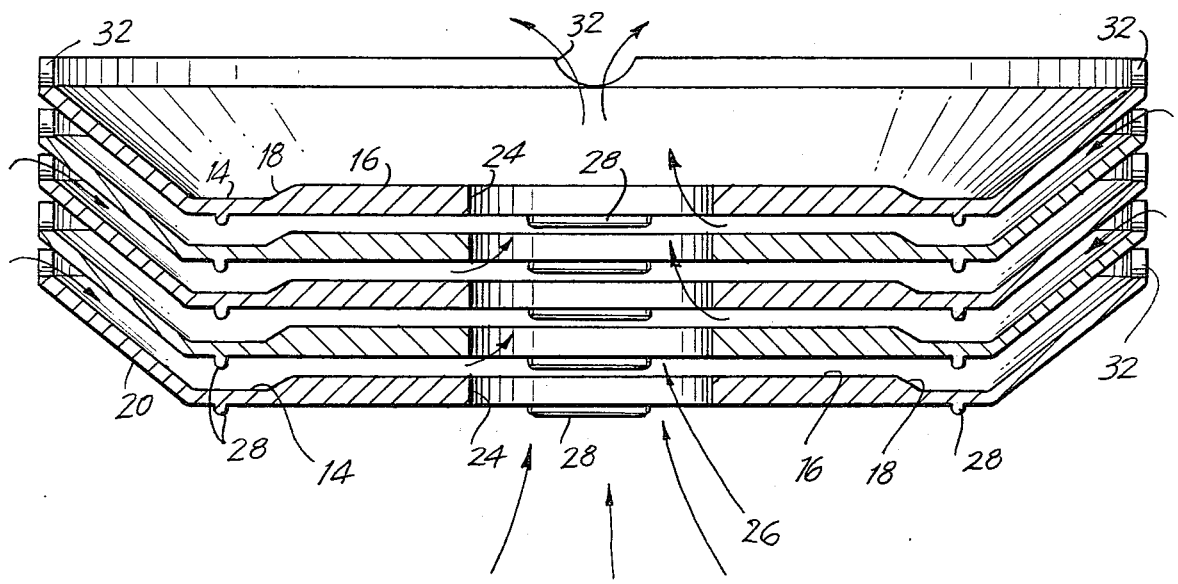
FIG.4

HEATING PELLET

BACKGROUND OF THE INVENTION

1. Field of the Invention

This invention relates to an improved heating pellet, and more particularly to a heating pellet of the type used in hospitals and other food-service operations to keep food in a warmed state on a serving plate after the serving plate has been placed on a heated pellet.

2. Description of the Prior Art

Heating pellets have been used heretofore in the service of prepared meals, for example in a hospital or other type of institution, to maintain food in a warmed state between the time it is served in appropriate portions on a serving plate until the time when it is distributed to the person eating the meal. Typically, the pellets are stacked one on top of another and are placed in an oven and heated to a temperature of about 250° F. The pellets are then removed from the oven and placed on a serving tray, and each serving plate with food is placed on a heated pellet, which keeps the plate and food in a warmed state until it can be served. Because the pellets must be heated by conduction, it takes a considerable period of time in the heating oven to raise the temperature of the pellets to 250° F. resulting in high energy requirements.

One example of a heating pellet previously used for such an application is a simple cast-aluminum disc generally in the shape of a pie pan, the outer portion of which angles upwardly and ends in a vertically projecting rim. The pellet is designed so that the upper surface of the pellet approximately matches in size and shape the bottom exterior configuration of the serving plates with which it is intended to be used. Spacers may be embossed on the bottom of the pellet in order to separate it from the surface on which it is placed.

Such prior art pellets have certain disadvantages. For example, it is very difficult to remove a plate from such a pellet without spilling the food that is on the plate, because one's fingers cannot be inserted between the plate and the vertical rim of the heated pellet. If a sharp instrument were to be used in an attempt to pry the plate from the pellet, there is the likely possibility of catapulting the plate from the pellet, spilling the food and possibly breaking the plate.

Also, these prior art pellets are not efficient for use in a forced air convection oven, which is the optimum heating system for this purpose as it uses less energy. In a convection oven, for fastest heating it is essential that the forced hot air to be permitted to reach all parts of the pellets. The pellets are most efficiently heated in a stack, and therefore the hot air must have room to circulate between the stacked pellets. Pellets previously in use, however, have failed to provide any clearance for air flow from the edges to the centers of the pellets and further provided no other path for air flow, and thus could not be effectively heated in lower energy convection ovens.

OBJECTS AND SUMMARY OF THE INVENTION

Accordingly, it is one object of the present invention to provide a heating pellet from which a plate containing food can easily be removed without disturbing the food or damaging either the plate or the pellet.

A further object of the present invention is to provide a heating pellet with an improved shape that facilitates the circulation of air over all surfaces of the pellet in a forced air convection heating system, achieving savings of energy, time, and manpower.

In accordance with the present invention, the foregoing objects are met by several novel features. First, the vertical rim around the circumference of the pellet is not continuous, but rather has several notches, which extend from the top of the rim to below the level of the edge of a plate accommodated in the pellet. The plate can thereby be lifted easily from the pellet with the fingers, by touching at least two points on its outer edge through the notches.

Also, the pellet is separated from the surface on which it is placed by spacers embossed on the bottom of the pellet. Such separation results in reduced heat loss, by providing a layer of air to insulate the pellet from the surface, leading to further energy savings and better food quality when served.

The second enumerated object of the invention is met in two ways. First, a hole is provided in the center of each pellet. Hot air is able to circulate in the open column through the center of a stack of pellets, and, in addition, reaches the center from the spaces around the stack by entering the finger notches. In another embodiment, the rims of the stacked pellets are separated by larger embossed spacers on the bottom of each pellet, which rest on the upper surface of the pellet below. Such separation results in still better air flow between the edges and the centers of the pellets.

The foregoing and other objects and advantages of the present invention will become more readily apparent after consideration of the following specification and drawings.

BRIEF DESCRIPTION OF THE DRAWINGS

FIG. 3 is a cross-sectional view along line 3—3 of FIG. 2 of a heating pellet in normal use, with a plate accommodated in the pellet.

FIG. 4 is a cross-sectional view, similar to that in FIG. 3, showing a stack of heating pellets.

DESCRIPTION OF THE PREFERRED EMBODIMENT

Figure 1:
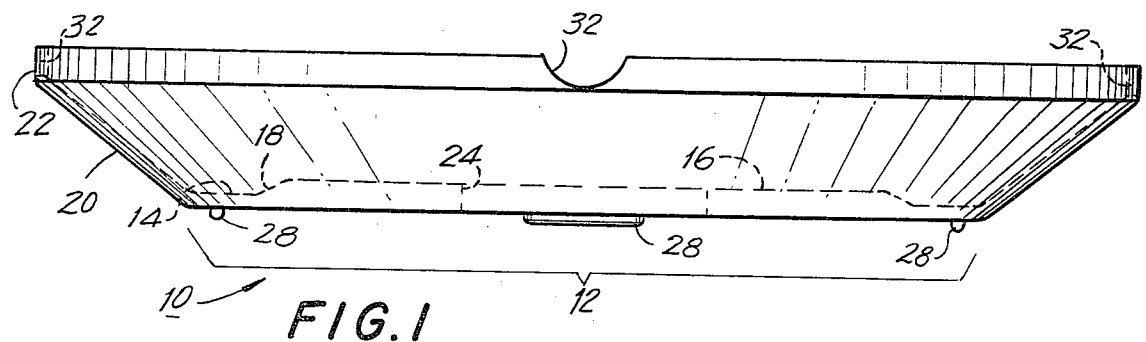
FIGS. 1 and 2 are side and top views, respectively, of a heating pellet constructed in accordance with the present invention.
Figure 2:
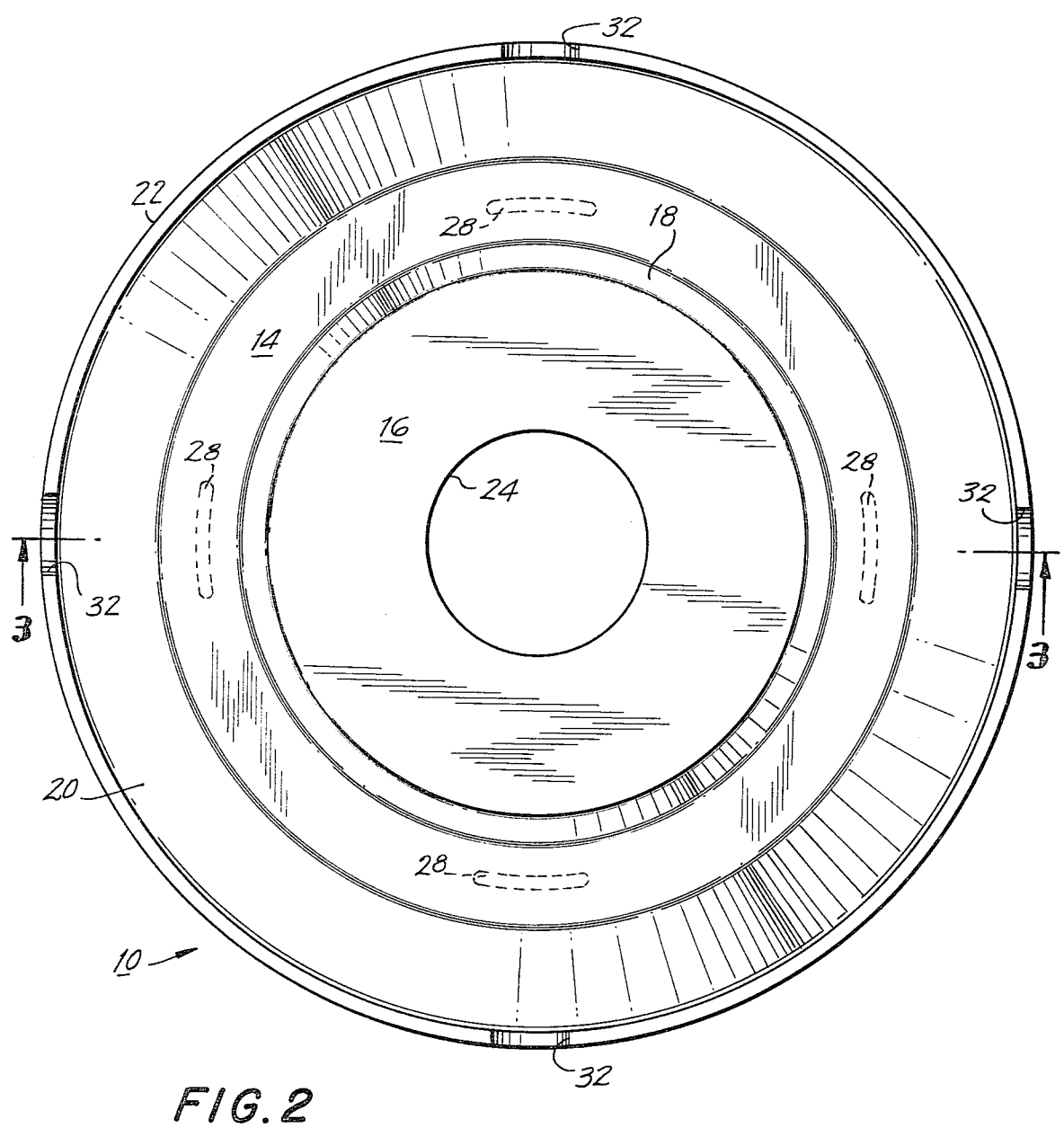

Referring to FIGS. 1 and 2, the heating pellet 10 of the present invention is seen to be of a shape substantially wider than it is high, generally resembling a circular pie pan. It is preferably cast as a single unit in aluminum or any other light material which exhibits a high heat retentivity. The bottom area 12 has an annular outer ring 14 and a circular central area 16. The bottom of the pellet is thicker in the central area than in the outer ring in this embodiment, which is believed to result in advantageous heat retention in the neighborhood of the center of the plate with which the pellet is used. The top surface of the outer ring 14 slopes gradually up to that of the thicker central area 16 through a transitional ring 18.

Sidewall 20 is formed as a continuation of bottom area 12 beyond the outer ring 14 and it extends outwardly away from the center of the heating pellet and upwardly at an angle. This angle of inclination is dependent upon the shape of a serving plate to be used with the pellet and, in the embodiment shown, is about 45°. Extending vertically from the perimeter of the sidewall 20 is a rim 22 which in this embodiment is approximately one-fourth inch in height.

FIGS. 1, 2, and 4 illustrate the novel features of the invention which facilitate the rapid heating of the pellets through allowing the flow of hot air in a convection oven. At the center of bottom area 12 of each heating pellet is formed a circular hole 24. As seen in FIG. 4, hot air reaches the central portions of each one of a stack of heating pellets as it rises through the central core space 26 formed by these holes.

FIG. 3 is a cross-sectional view of a heating pellet 10 in which has been placed an ordinary dinner plate 30. This is the arrangement in normal use, in which the heating pellet is being used to keep a plate of food warm until it can be served. The dimensions of the plate and pellet are selected such that the plate will be supported by the sidewall 20 a very small distance inside and below rim 22. A plurality of notches 32 are provided in rim 22. In the preferred embodiment there are four notches extending downwardly, from the top substantially to the bottom of rim 22. They are approximately semicircular with a diameter of approximately five-eighths inch, and are provided with an upwardly concave surface. As can be seen in FIG. 3, the outer rim 34 of a plate 30 in normal use is supported by sidewall 20 just inside notches 32. In this position, the outer rim 34 of the plate can be touched by one's fingers inserted from the outside of the pellet into the notches 32, and the plate can thereby be lifted out of the heating pellet with relative ease and without disturbing its contents. Notches 32 also serve another beneficial purpose in that they provide an air access flow path, when a number of pellets are in a stack, permitting air to flow around and through the hole 24. It is believed that when hot air is being forced upwardly through the central core space, the Venturi effect will cause hot air to be drawn between the pellets from the outside to the center, as shown in FIG. 4. Thus warm air in a convection oven can readily flow around and heat each pellet in a stack.

Another feature of the present invention, which achieves still greater energy savings as well as improved food quality, is a plurality of spacers 28, which extend downwardly from outer ring 14. In the preferred embodiment, the spacers are bosses in the shape of circular arcs that are concentric with hole 24 and are approximately 1 inch in length and one-sixteenth inch in height. These spacers provide for a layer of insulating air between the warmed pellet and the table or other surface on which it is resting. They therefore result in reduced heat loss to the surface, and warmer food at the time of service.

In another embodiment, not pictured, the stacked pellets are held in spaced-apart relationship by spacers 28, which extend downwardly from the outer ring 14 and are of sufficiently augmented height that the respective rims 22 of the pellets do not come into contact with each other. The spacers 28 in the alternate embodiment make it possible for even more hot air to circulate between the pellets in the space that lies between the central core space and the area outside the stack.

Thus the heating pellet 10 meets the objectives set forth above: it provides for more rapid and efficient heating in a more energy efficient forced air convection oven, and for more convenient removal of plates from heating pellets without damage to the plates or their contents.

It is thus seen that the present invention provides an improved heating pellet for retaining serving plates of food in a warmed state for a period of time. The improved heating pellet is provided with spacers extending from its bottom surface to prevent heat loss to the surface on which the pellet rests and an air access hole through the central bottom area of the pellet. Finger access notches are also provided to allow ready removal of a plate of food from the heating pellet, and the notches also provide a flow path for air to circulate between and around individual pellets when they are in a stacked state. Thus, the pellets can be conveniently and rapidly heated in a more energy efficient forced air convection oven, as the moving hot air in the oven can flow around and through each pellet in a stack to elevate its temperature to a desired level rapidly and efficiently.

The preceding description is intended to be illustrative rather than limiting. Various changes and modifications in the embodiments described herein may be effected by one skilled in the art without departing from the spirit and scope of the invention, as defined in the appended claims.

What is claimed is:

1. A heating pellet comprising:
   a circular bottom area comprising a circular central area, an outer ring and a concentric annular transitional ring between said central area and said outer ring;
   a concentric sidewall extending outwardly and upwardly from said outer ring;
   a concentric rim extending upwardly from said sidewall;
   said concentric rim being of sufficient vertical dimension so as to permit an upper similarly dimensioned heating pellet to nest and stack over a similarly dimensioned lower heating pellet so that the top of the concentric rim of the lower pellet is in contact with and nestingly supports the upper pellet only at a substantially annular contact area on the underside of the concentric sidewall of the upper pellet near its concentric rim whereby said upper pellet is nested within said lower pellet with a space between the upper and lower pellets inwardly from said annular contact area;
   said rim having at least one notch permitting the passage of air from outside said rim into the space between said upper and lower pellets when a plurality of similarly dimensioned pellets are in a nested and stacked relationship; and
   an access hole through said circular central area of sufficient transverse dimension so as to permit the passage of air through adjacent access holes of a plurality of similarly dimensioned pellets in a nested and stacked relationship,
   whereby a plurality of similarly dimensioned nested and stacked pellets may be heated or chilled by convection by circulating warmed or chilled air over and through the space between nested and stacked pellets through said notch and access hole.

2. A heating pellet as defined in claim 1 including spacing means depending from the lower side of said bottom area whereby when said pellet is placed on a flat surface only said spacing means contacts said surface thereby to minimize the surface area of contact between said pellet and said surface to minimize conductive heat transfer between said pellet and said surface.

3. A heating pellet as defined in claim 2 in which said spacing means consists of four circumferentially spaced bosses in the shape of arcs concentric with said outer ring.

4. A heating pellet as defined in claim 1 in which said rim has four spaced semicircular notches of a size permitting a finger to be inserted from the outside to the inside of said rim.

5. A heating pellet as defined in claim 1, in which the notch is sized to permit a finger to be inserted from the outside to the inside of the rim, for removing objects accommodated within the pellet close to the rim and substantially below the top thereof.

* * * * *